(12) United States Patent
Yamamoto

(10) Patent No.: US 10,525,563 B2
(45) Date of Patent: Jan. 7, 2020

(54) ABNORMALITY-DETECTING DEVICE AND METHOD FOR TOOL OF MACHINE TOOL

(71) Applicant: MITSUBISHI HEAVY INDUSTRIES MACHINE TOOL CO., LTD., Ritto-shi, Shiga (JP)

(72) Inventor: Hideaki Yamamoto, Ritto (JP)

(73) Assignee: MITSUBISHI HEAVY INDUSTRIES MACHINE TOOL CO., LTD., Ritto-Shi (JP)

(*) Notice: Subject to any disclaimer, the term of this patent is extended or adjusted under 35 U.S.C. 154(b) by 0 days.

(21) Appl. No.: 16/324,044

(22) PCT Filed: Jul. 4, 2017

(86) PCT No.: PCT/JP2017/024447
§ 371 (c)(1),
(2) Date: Feb. 7, 2019

(87) PCT Pub. No.: WO2018/030033
PCT Pub. Date: Feb. 15, 2018

(65) Prior Publication Data
US 2019/0210176 A1 Jul. 11, 2019

(30) Foreign Application Priority Data
Aug. 10, 2016 (JP) ................. 2016-157278

(51) Int. Cl.
*B23Q 17/00* (2006.01)
*G05B 13/00* (2006.01)
(Continued)

(52) U.S. Cl.
CPC ......... *B23Q 17/0952* (2013.01); *B23Q 17/09* (2013.01); *G05B 13/0265* (2013.01);
(Continued)

(58) Field of Classification Search
CPC ............... B23Q 17/0952; B23Q 17/09; G05B 13/0265; G05B 19/4065; G05B 23/02
See application file for complete search history.

(56) References Cited

U.S. PATENT DOCUMENTS 5,579,232 A * 11/1996 Tong .................. G05B 19/4065
340/683
9,349,099 B2 * 5/2016 Pinckney ............... G06Q 30/02
(Continued)

FOREIGN PATENT DOCUMENTS

| JP | 62-74553 A | 4/1987 |
|---|---|---|
| JP | 7-182035 A | 7/1995 |

(Continued)

OTHER PUBLICATIONS

International Preliminary Report on Patentability and English translation of the Written Opinion of the International Searching Authority for International Application No. PCT/JP2017/024447, dated Feb. 21, 2019.
(Continued)

*Primary Examiner* — Ronald D Hartman, Jr.
(74) *Attorney, Agent, or Firm* — Birch, Stewart, Kolasch & Birch, LLP

(57) ABSTRACT

An abnormality-detecting device for detecting abnormalities of a tool of a machine tool comprises: an acquiring unit for acquiring multiple measured values relating to the tool as measurement data (vibration information, cutting force information, sound information, main shaft load, motor current, power value); a normal model unit for learning the measurement data acquired during normal machining by one class machine learning and creating a normal model; an abnormality-diagnosing unit for acquiring measurement data during machining after creation of the normal model while diagnosing whether said measurement data is normal or abnormal on the basis of the normal model; and a
(Continued)

re-diagnosing unit for re-diagnosing measurement data, which has been diagnosed to be abnormal by the abnormality-diagnosing unit, by a method different from the abnormality-diagnosing unit.

14 Claims, 13 Drawing Sheets

(51) Int. Cl.
    *G05B 23/02*     (2006.01)
    *B23Q 17/09*     (2006.01)
    *G05B 13/02*     (2006.01)
    *G05B 19/4065*     (2006.01)

(52) U.S. Cl.
    CPC ......... *G05B 19/4065* (2013.01); *G05B 23/02* (2013.01); *B23Q 2220/006* (2013.01); *B23Q 2717/00* (2013.01); *G05B 2219/33034* (2013.01); *G05B 2219/34465* (2013.01)

(56) References Cited

U.S. PATENT DOCUMENTS

| | | | | |
|---|---|---|---|---|
| 10,379,517 | B2* | 8/2019 | Shapiro | G05B 19/18 |
| 2004/0143725 | A1* | 7/2004 | Addison | B82Y 10/00 |
| | | | | 712/28 |
| 2007/0094166 | A1* | 4/2007 | Addison | B82Y 10/00 |
| | | | | 706/13 |
| 2014/0123740 | A1 | 5/2014 | Yoshikawa et al. | |
| 2015/0088183 | A1* | 3/2015 | Vipperman | A61B 17/1695 |
| | | | | 606/172 |
| 2015/0293523 | A1 | 10/2015 | Yamamoto et al. | |
| 2017/0235294 | A1* | 8/2017 | Shapiro | B23K 37/0235 |
| | | | | 700/97 |
| 2017/0320182 | A1* | 11/2017 | Jeong | B23Q 17/098 |
| 2018/0100894 | A1* | 4/2018 | Venetsky | G01R 31/318364 |
| 2018/0239345 | A1 | 8/2018 | Noda | |
| 2019/0210176 | A1* | 7/2019 | Yamamoto | B23Q 17/09 |

FOREIGN PATENT DOCUMENTS

| | | | |
|---|---|---|---|
| JP | 8-328651 | A | 12/1996 |
| JP | 11-267949 | A | 10/1999 |
| JP | 2010-142934 | A | 7/2010 |
| JP | 2012-150721 | A | 8/2012 |
| JP | 5710391 | B2 | 4/2015 |
| JP | 2015-203646 | A | 11/2015 |
| JP | 5831216 | B2 | 12/2015 |
| JP | 5845374 | B1 | 1/2016 |
| JP | 2016-40072 | A | 3/2016 |
| WO | WO 2011/089649 | A1 | 7/2011 |
| WO | WO 2017-022784 | A1 | 2/2017 |

OTHER PUBLICATIONS

International Search Report, issued in PCT/JP2017/024447, PCT/ISA/210, dated Sep. 19, 2017.
Notification of Reasons for Refusal for Japanese Application No. 2016-157278, dated Aug. 14, 2018.
The Decision to Grant a Patent has been received for JP 2016-157278 dated Oct. 23, 2018.
Written Opinion of the International Searching Authority, issued in PCT/JP2017/024447, PCT/ISA/237, dated Sep. 19, 2017.

* cited by examiner

ABNORMALITY-DETECTING DEVICE AND METHOD FOR TOOL OF MACHINE TOOL

TECHNICAL FIELD

The present invention relates to abnormality-detecting devices and methods for detecting abnormalities in tools of machine tools.

BACKGROUND ART

While machining/grinding is performed using a machine tool, if wear or chipping occurs in the tool, the machining precision for the workpiece deteriorates, producing defective workpieces. If the yield rate decreases due to the occurrence of defective workpieces, a large amount of loss may occur depending on the cost of the workpieces. For this reason, techniques for diagnosing abnormalities in tools have been proposed in which various signals are measured in real time during machining and compared to thresholds for the signals (Patent Documents 1 to 3).

PRIOR ART DOCUMENT

Patent Document

Patent Document 1: Japanese Patent Application Publication No. 2016-40072
Patent Document 2: Japanese Patent No. 5831216
Patent Document 3: Japanese Patent No. 5710391

SUMMARY OF THE INVENTION

Problems to be Solved by the Invention

Although different signals are acquired in the above Patent Documents 1 to 3, a threshold is set, for example, for the spindle load, which is a diagnosis signal, as illustrated as an example in FIG. 13, and the signal is compared to the threshold to perform abnormality diagnosis. However, such a signal (for example, the machining load (spindle load), cutting force, or cutting vibration) varies depending on cutting conditions (such as the tool type, workpiece material, cutting amount (chip discharge amount), feed speed, and spindle rotation speed), and it is difficult to set thresholds. For this reason, Patent Document 3 discloses a method for determining thresholds for abnormality diagnosis. Since it is difficult to set thresholds in conventional abnormality diagnoses as above, and the thresholds difficult to set are used to perform abnormality diagnosis, improvement in the diagnostic accuracy has not been conceivable.

The present invention has been made in light of the above problems, and an object thereof is to provide an abnormality-detecting device and method for tools of machine tools having improved diagnostic accuracy.

Means for Solving the Problems

An abnormality-detecting device for a tool of a machine tool that detects abnormality in a tool of a machine tool, according to a first aspect of the invention to solve the above problems, comprises:
an acquiring unit that acquires multiple measured values related to the tool as measurement data;
a first learning unit that performs one-class machine learning using the measurement data acquired during normal machining to create a normal model;
a diagnosing unit that, while acquiring the measurement data during machining after the normal model is created, diagnoses based on the normal model whether the measurement data is normal or abnormal; and a re-diagnosing unit that re-diagnoses the measurement data that has been diagnosed as abnormal by the diagnosing unit, using a method different from a method that the diagnosing unit has performed.

An abnormality-detecting device for a tool of a machine tool, according to a second aspect of the invention to solve the above problems is
the abnormality-detecting device for a tool of a machine tool according to the first aspect of the invention, wherein
the first learning unit updates the normal model by performing the one-class machine learning using the measurement data that has been diagnosed as not abnormal by the diagnosing unit and the measurement data that has been diagnosed as not abnormal by the re-diagnosing unit.

An abnormality-detecting device for a tool of a machine tool, according to a third aspect of the invention to solve the above problems is
the abnormality-detecting device for a tool of a machine tool according to the first or second aspect of the invention, further comprising
a handling unit that stops machining performed with the tool when the measurement data is diagnosed as abnormal by the diagnosing unit or the re-diagnosing unit.

An abnormality-detecting device for a tool of a machine tool, according to a fourth aspect of the invention to solve the above problems is
the abnormality-detecting device for a tool of a machine tool according to any one of the first to third aspects of the invention, wherein
the first learning unit creates or updates the normal model by performing the one-class machine learning, adding setting data related to a machining condition and cutting information for machining.

An abnormality-detecting device for a tool of a machine tool, according to a fifth aspect of the invention to solve the above problems is
the abnormality-detecting device for a tool of a machine tool according to any one of the first to fourth aspects of the invention, further comprising
an estimating unit that, in the case where the one-class machine learning is a one-class support vector machine using a kernel method, performs the machine learning to make a discriminant function that diagnoses whether the measurement data is normal or abnormal by a positive or negative sign of the discriminant function, and based on a temporal change in a value of the discriminant function with the measurement data inputted, estimates time when the value changes from a positive value to 0 as a replacement timing for the tool.

An abnormality-detecting device for a tool of a machine tool, according to a sixth aspect of the invention to solve the above problems is
the abnormality-detecting device for a tool of a machine tool according to any one of the first to fifth aspects of the invention, further comprising:
a second learning unit that performs multi-class machine learning using multiple sets of the measurement data that have been diagnosed as abnormal by the diagnosing unit and stored, to create a diagnostic model; and
a classifying unit that, while acquiring the measurement data during machining after the diagnostic model is created, classifies a state of the measurement data based on the diagnostic model to classify a state of abnormality in the tool.

An abnormality-detecting device for a tool of a machine tool, according to a seventh aspect of the invention to solve the above problems is the abnormality-detecting device for a tool of a machine tool according to the sixth aspect of the invention, wherein the second learning unit updates the diagnostic model after the diagnostic model is created by performing the multi-class machine learning using the measurement data that has been diagnosed as abnormal by the diagnosing unit.

An abnormality-detecting method for a tool of a machine tool, used for detecting abnormality in a tool of a machine tool, according to an eighth aspect of the invention to solve the above problems, comprises:

an acquiring step of acquiring multiple measured values related to the tool as measurement data;

a first learning step of performing one-class machine learning using the measurement data acquired during normal machining to create a normal model;

a diagnosing step of, while acquiring the measurement data during machining after the normal model is created, diagnosing based on the normal model whether the measurement data is normal or abnormal; and a re-diagnosing step of re-diagnosing the measurement data that has been diagnosed as abnormal in the diagnosing step, using a method different from a method that has been performed in the diagnosing step.

An abnormality-detecting method for a tool of a machine tool, according to a ninth aspect of the invention to solve the above problems is the abnormality-detecting method for a tool of a machine tool according to the eighth aspect of the invention, wherein in the first learning step, the normal model is updated by performing the one-class machine learning using the measurement data that has been diagnosed as not abnormal in the diagnosing unit and the measurement data that has been diagnosed as not abnormal in the re-diagnosing unit.

An abnormality-detecting method for a tool of a machine tool, according to a tenth aspect of the invention to solve the above problems is the abnormality-detecting method for a tool of a machine tool according to the eighth or ninth aspect of the invention, further comprising a handling step of stopping machining performed with the tool when the measurement data is diagnosed as abnormal in the diagnosing step or the re-diagnosing step.

An abnormality-detecting method for a tool of a machine tool, according to an eleventh aspect of the invention to solve the above problems is the abnormality-detecting method for a tool of a machine tool according to any one of the eighth to tenth aspects of the invention, wherein in the first learning step, the normal model is created or updated by performing the one-class machine learning, adding setting data related to a machining condition and cutting information for machining.

An abnormality-detecting method for a tool of a machine tool, according to a twelfth aspect of the invention to solve the above problems is the abnormality-detecting method for a tool of a machine tool according to any one of the eighth to eleventh aspects of the invention, further comprising an estimating step of, in the case where the one-class machine learning is a one-class support vector machine using a kernel method, performing the machine learning to make a discriminant function that diagnoses whether the measurement data is normal or abnormal by a positive or negative sign of the discriminant function, and based on a temporal change in a value of the discriminant function with the measurement data inputted, estimating time when the value changes from a positive value to 0 as a replacement timing for the tool.

An abnormality-detecting method for a tool of a machine tool, according to a thirteenth aspect of the invention to solve the above problems is the abnormality-detecting method for a tool of a machine tool according to any one of the eighth to twelfth aspects of the invention, further comprising:

a second learning step of performing multi-class machine learning, using multiple sets of the measurement data that have been diagnosed as abnormal in the diagnosing step and stored, to create a diagnostic model; and a classifying step of, while acquiring the measurement data during machining after the diagnostic model is created, classifying a state of the measurement data based on the diagnostic model to classify a state of abnormality in the tool.

An abnormality-detecting method for a tool of a machine tool, according to a fourteenth aspect of the invention to solve the above problems is the abnormality-detecting method for a tool of a machine tool according to the thirteenth aspect of the invention, wherein in the second learning step, the diagnostic model is updated after the diagnostic model is created by performing the multi-class machine learning using the measurement data that has been diagnosed as abnormal in the diagnosing step.

Effect of the Invention

The present invention improves the diagnostic accuracy.

MODE FOR CARRYING OUT THE INVENTION

Hereinafter, description will be provided for some embodiments of an abnormality-detecting device and method for tools of machine tools according to the present invention with reference to FIGS. 1 to 12. Although here, for a machine tool to be diagnosed, a gate-shaped machine tool is illustrated in FIG. 2 as an example, the present invention is applicable to other machine tools that use tools.

Example 1

Figure 1:
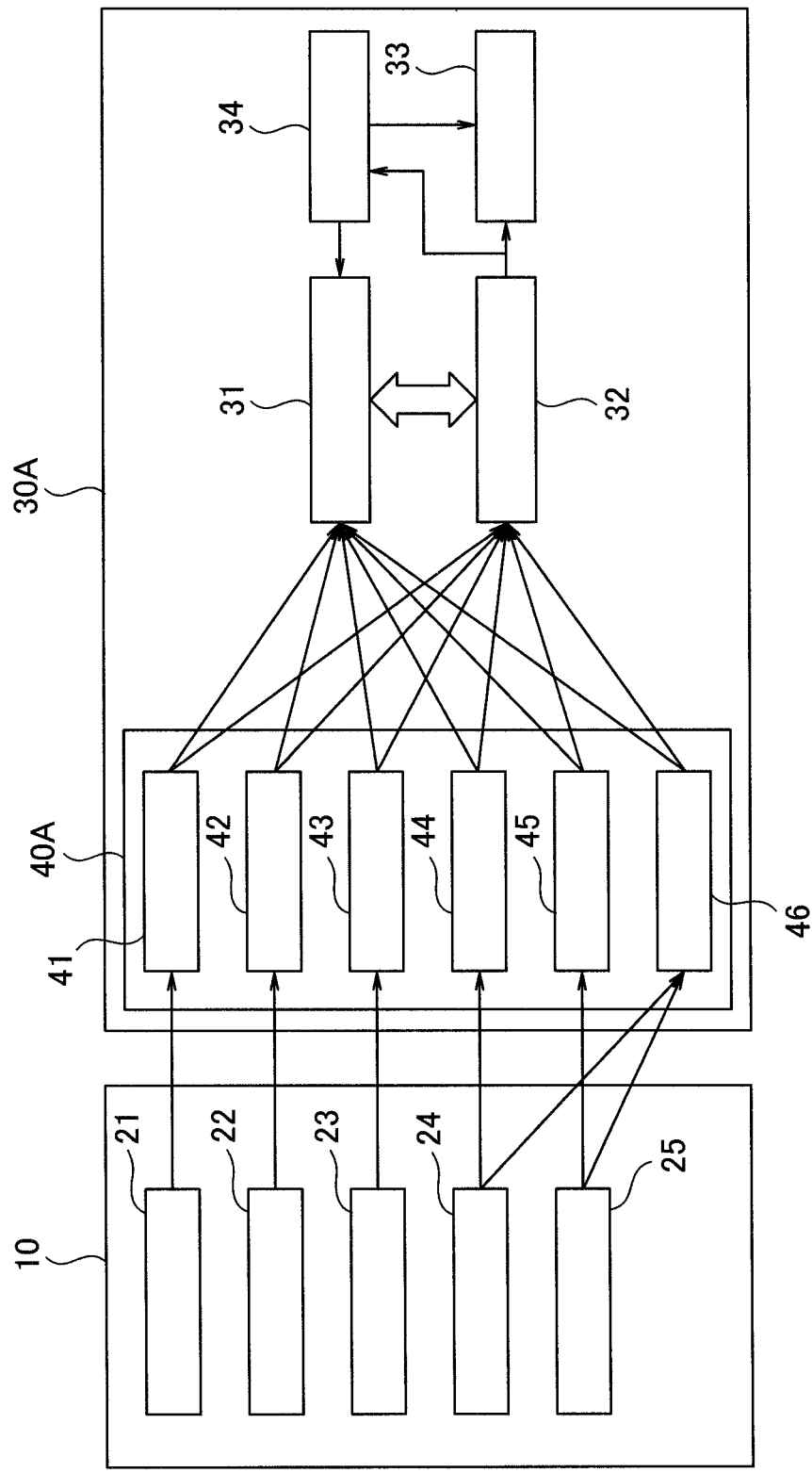
FIG. 1 is a configuration diagram illustrating an example (example 1) of an embodiment of an abnormality-detecting device for tools of machine tools according to the present invention.
Figure 2:
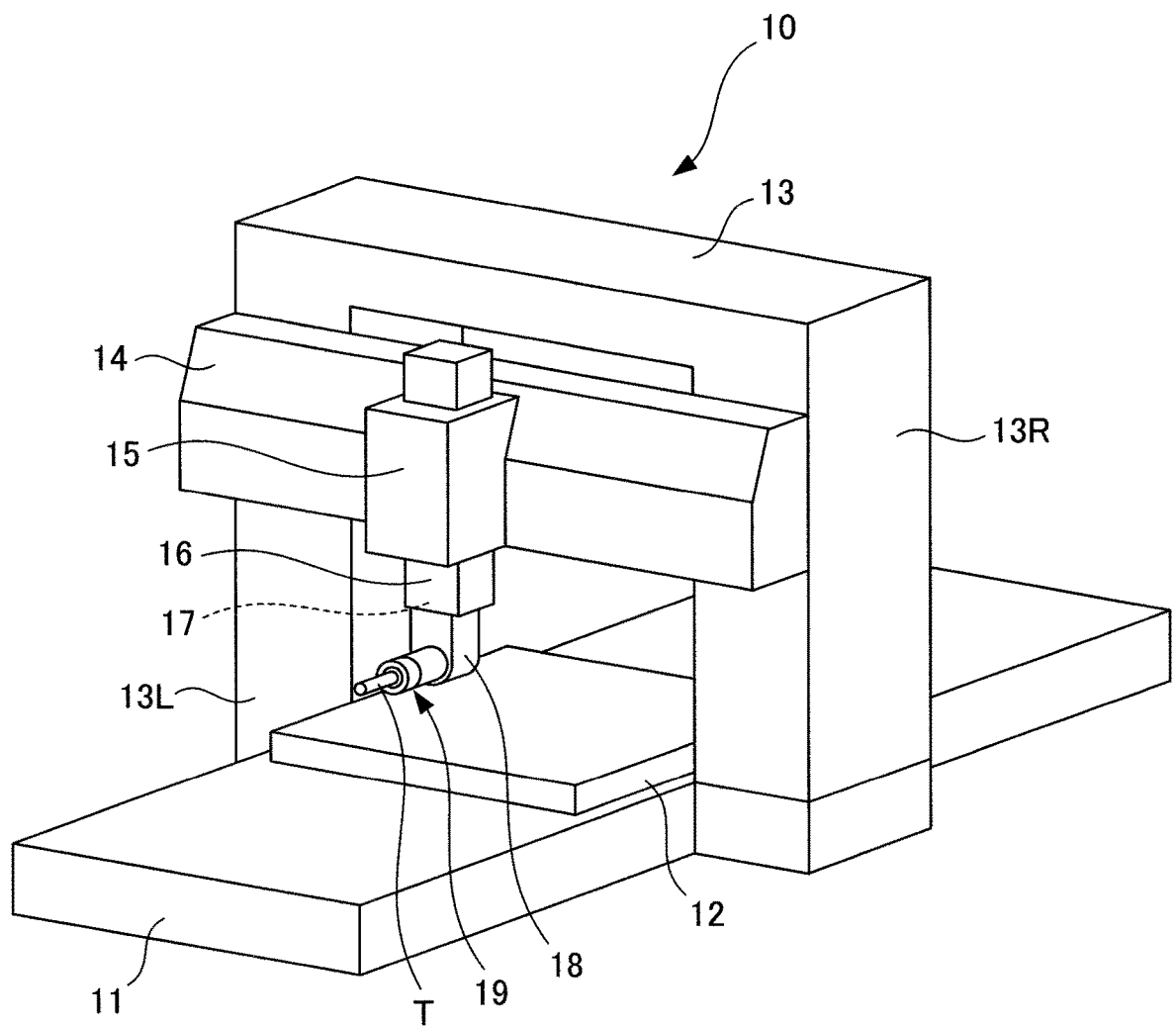
FIG. 2 is a perspective view of an example of a machine tool to be diagnosed.
Figure 3:
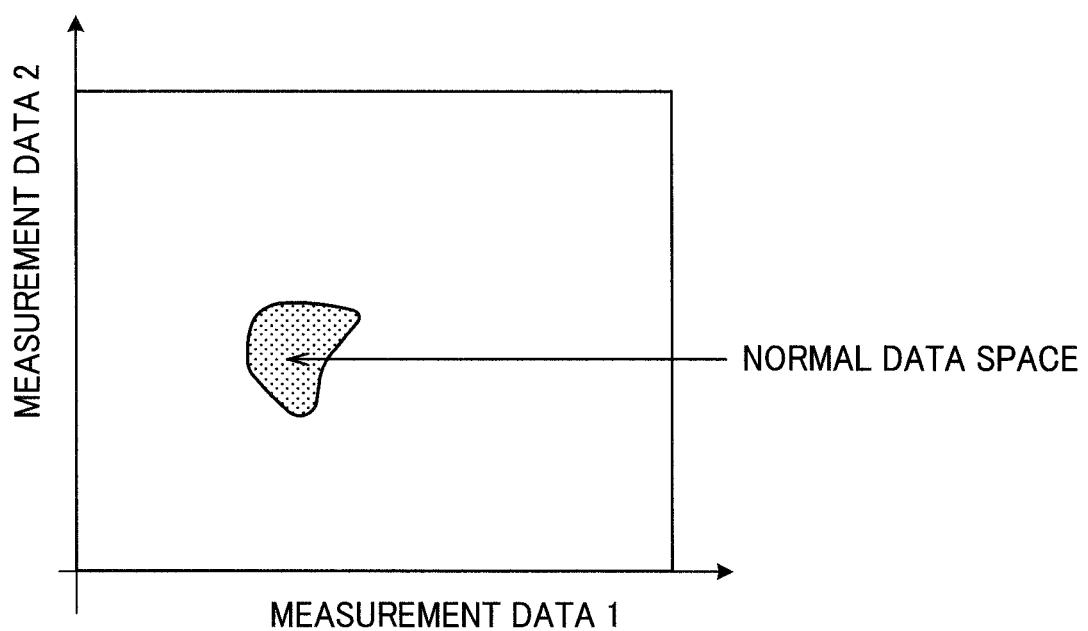
FIG. 3 is a diagram for explaining a normal data space created by one-class machine learning.
Figure 4:
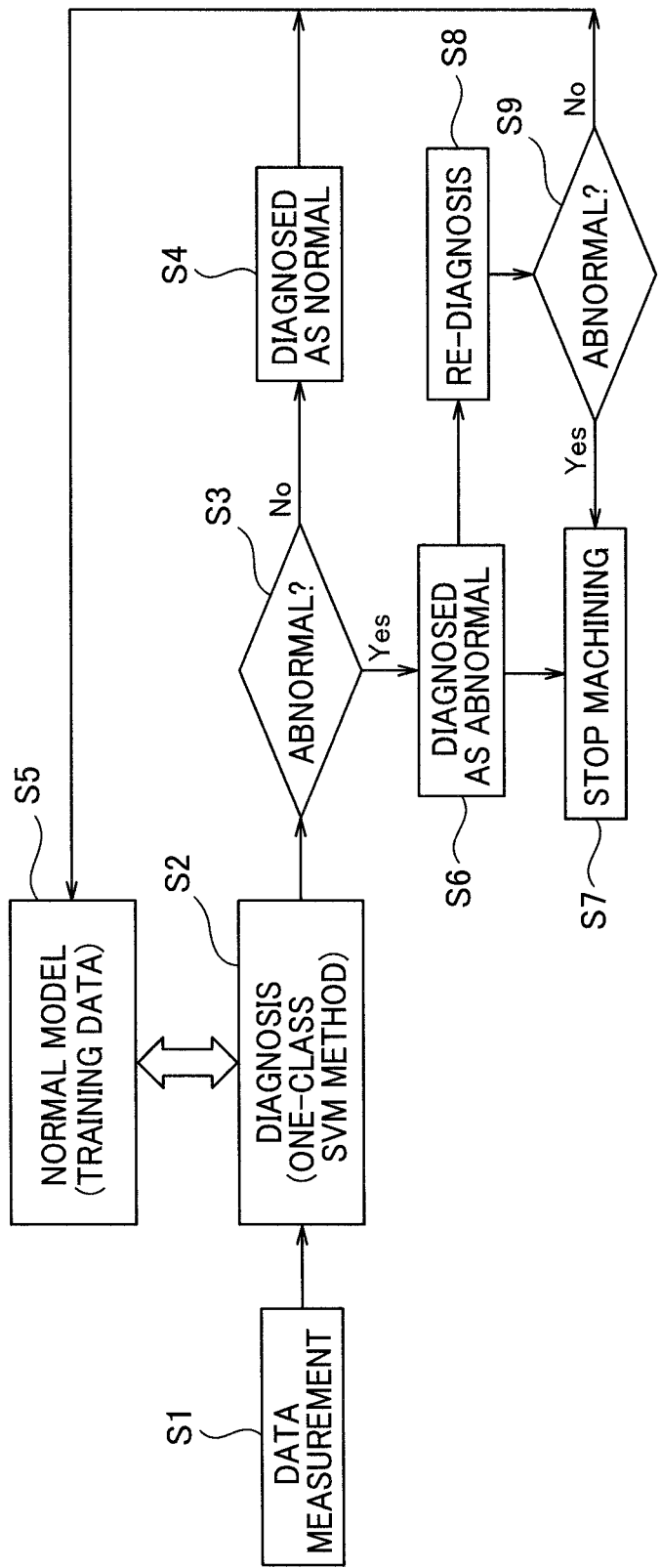
FIG. 4 is a diagram for explaining the procedure of an abnormality-detecting method implemented in the abnormality-detecting device for tools of machine tools illustrated in FIG. 1.

FIG. 1 is a configuration diagram illustrating an abnormality-detecting device for tools of machine tools according to this example, and FIG. 2 is a perspective view of an example of a machine tool to be diagnosed. FIG. 3 is a diagram for explaining a normal data space created by one-class machine learning, and FIG. 4 is a diagram for explaining the procedure of an abnormality-detecting method implemented in the abnormality-detecting device for tools of machine tools illustrated in FIG. 1.

First, with reference to FIG. 2, the structure of the machine tool to be diagnosed will be described. In this example, the machine tool to be diagnosed is a gate-shaped machine tool 10. This gate-shaped machine tool 10 has a bed 11, table 12, column 13, cross rail 14, saddle 15, ram 16, spindle 17, attachment 18, tool unit 19, tool T, and the like.

The bed 11 is disposed horizontally on the floor surface. Disposed on the bed 11 are the table 12 and the column 13. The table 12 is a table where a workpiece (not illustrated), which is machined, is placed and is movable in one horizontal direction on the bed 11. The column 13, having a shape like a gate, is arranged to astride the bed 11 and has the left column 13L and right column 13R standing vertically at the right and left portions of the bed 11. The cross rail 14 is attached to cross the left column 13L and right column 13R horizontally and is movable along vertically sliding surfaces of the left column 13L and right column 13R.

The saddle 15 is attached to the cross rail 14 to be movable in the horizontal direction along a horizontally sliding surface of the cross rail 14. The ram 16 is held by the saddle 15 to be movable in the vertical direction being guided by vertically sliding surfaces of the saddle 15. The spindle 17 is disposed inside the ram 16 to be rotatable by a spindle motor 24 described later. Attached to the spindle 17 is a tool unit 19 having the tool T, via the attachment 18.

The gate-shaped machine tool 10 with the above configuration has a vibration sensor 21 for measuring the vibration of the tool T (spindle 17), a tool dynamometer 22 for measuring the cutting force of the tool T (spindle 17), and a noise sensor 23 for measuring the noise of the tool T (spindle 17), as illustrated in FIG. 1, in order to measure abnormalities in the tool T, for example, to measure abnormalities in the tool T itself, such as tool wear, tool snapping, chipping, and breakage, and abnormalities in the machining state of the tool T. In addition, the spindle load 44 and the electric power 46 are measured from the spindle motor 24 which drives the spindle 17. Further, for example, from a feed motor 25 that drives the ram 16, the motor current 45 and the electric power 46 are measured. Note that although here, the feed motor 25 which drives the ram 16 is illustrated as a typical example, multiple feed motors are provided in association with the moving directions (for example, X, Y, and Z directions).

Then, vibration measured by the vibration sensor 21, cutting force measured by the tool dynamometer 22, and noise measured by noise sensor 23 are acquired by an acquiring unit 40A of an abnormality-detecting device 30A as vibration information 41, cutting force information 42, and noise information 43, respectively. In addition, the spindle load 44, motor current 45, and electric power 46 described above are also acquired by the acquiring unit 40A. These pieces of information are used for machine learning and diagnosis described later.

Note that hereinafter, the vibration information 41, cutting force information 42, noise information 43, spindle load 44, motor current 45, and electric power 46 are collectively called measurement data. Although here, for the measurement data, the vibration information 41, cutting force information 42, noise information 43, spindle load 44, motor current 45, and electric power 46 are taken as examples, other kinds of measurement data may be added if they are related to the tool T.

To detect abnormalities in the tool T of the gate-shaped machine tool 10, the abnormality-detecting device 30A has, in addition to the acquiring unit 40A described above, a normal model unit 31 (first learning unit), abnormality diagnosing unit 32 (diagnosing unit), abnormality handling unit 33 (handling unit), and re-diagnosing unit 34.

In the abnormality-detecting device 30A, the normal model unit 31 performs one-class machine learning using the measurement data acquired during normal machining and creates a normal model. After creating a normal model, the normal model unit 31 updates the normal model. The abnormality diagnosing unit 32 acquires measurement data during machining after a normal model is created and in parallel, performs abnormality diagnosis on the measurement data based on the normal model created by the normal model unit 31. The abnormality handling unit 33, when the abnormality diagnosing unit 32 or the re-diagnosing unit 34 diagnoses measurement data as abnormal, performs abnormality remedy processes, such as sounding and displaying an alarm and stopping machining performed with the tool T of the gate-shaped machine tool 10, for example. The re-diagnosing unit 34 performs re-diagnosis on the measurement data that has been diagnosed as abnormal by the abnormality diagnosing unit 32, using a method different from the one performed by the abnormality diagnosing unit 32.

Note that the abnormality-detecting device 30A described above can be implemented by a computer, which includes an input device, communication device, calculation device, storage device, output device as the device configuration. For example, the measurement data described above is acquired by the input device or the communication device, and the acquired measurement data is subjected to calculation process (diagnosis and machine learning) performed by the calculation device. When measurement data is diagnosed as normal, a normal model is created or updated and stored in the storage device; when measurement data is diagnosed as abnormal, the abnormality remedy process described above is performed using the output device or the communication device. In addition, programs for diagnosis, machine learning, and abnormality remedy processes are also stored in the storage device.

The normal model unit 31 of the abnormality-detecting device 30A described above performs pre-processing in advance. Specifically, when the gate-shaped machine tool 10 and the tool T are operating normally, machining is performed in advance according to a predetermined machining pattern. The measurement data acquired during this machining by the acquiring unit 40A is used in one-class machine learning to creates a normal model (the first learning step). For the predetermined machining pattern, it is preferable to use a machining pattern that is actually used. However, any other machining pattern may be used, such as a machining pattern of a basic operation.

As described above, in this example, machine learning is used to detect an abnormality in the tool T. Since it is often difficult to acquire measurement data in an abnormal condition, one-class machine learning, which allows for diagnosis in one-class classification (normal model), is used. Use of one-class machine learning as machine learning allows for abnormality diagnosis with only measurement data during normal machining.

For one-class machine learning, a one-class support vector machine method (hereinafter one-class SVM method), system invariant analysis, or the like can be used. Here, as an example, a one-class SVM method with a kernel method is used.

Here, the one-class SVM method with a kernel method will be described. First, kernel K is the inner product of vector data sets in a feature space. The one-class SVM method herein uses a Gaussian kernel expressed by the following formula (1) as an example. In the following formula (1), x and z are vector data in a feature space, and σ is a kernel parameter.

[Math. 1]

$$\kappa(x, z) = \exp\left(-\frac{\|x-z\|^2}{\sigma^2}\right) \quad (1)$$

Then, in the one-class SVM method with a kernel method, the optimum α is obtained for the evaluation function expressed by the following formula (2).

[Math. 2]

$$\min_{\alpha} \frac{1}{2} \sum_{i,j} \alpha_i \alpha_j \kappa(x_i, x_j), \text{ subject to } 0 \leq \alpha_i \leq \frac{1}{vl}, \sum_{i=1}^{l} \alpha_i = 1 \quad (2)$$

In the above formula (2), $x_i$ (i=1, 2, ..., l) and $x_j$ (j=1, 2, ..., l) are training data. Using these sets of training data, machine learning (training) to obtain the optimum α is performed. Here, l is the number of training data sets, and ν is the upper limit (soft margin) of the rate at which the training data is regarded as an outlier and is in a range of 0<ν≤1. For example, when ν is set to 0.1, 10% of the total training data is regarded as outliers at the maximum. In addition, $\alpha_i$ is closely associated with training data $x_i$, and $x_i$ that makes the relation $\alpha_i$>0 hold is called a support vector. Using $\alpha_i$ obtained through the training makes it possible to form a discriminant function g(x), expressed by the following formula (3), which discriminates between normal and abnormal according to the positive or negative sign of the function. With this discriminant function g(x), an SVM discrimination circuit is completed.

[Math. 3]

$$f(x) = \text{sgn}\{a\} = \text{sgn}\{g(x)\} = \text{sgn}\left\{\sum_{i=1}^{l} \alpha_i \kappa(x_i, x) - \sum_{i=1}^{l} \alpha_i \kappa(x_i, x_{SV})\right\} \quad (3)$$

In the above formula (3), sgn{ } is a sign function, which returns "+1" when diagnostic value a by discriminant function g(x) satisfies a≥0, in other words, when measurement data x belongs to the same class as that of training data $x_i$, and returns "−1" when diagnostic value a<0, in other words, when measurement data x does not belong to the same class as that of training data $x_i$. Here, $x_{SV}$ corresponds to $\alpha_i$ that satisfies 0<$\alpha_i$<1/(νl). In practice, because most of $\alpha_i$ are 0, only $\alpha_i$ that are not 0 and the corresponding training data $x_i$, in other words, support vector $x_i$ play important roles at discrimination.

With the machine learning in the one-class SVM method described above, for example, as illustrated in FIG. 3, measurement data (training data) in a normal condition is mapped in a mapping space (feature space) in the one-class SVM method to generate a normal data space. Then, information on the mapping space including the normal data space generated is stored in the storage device as a normal model. Note that to make the diagram simple, FIG. 3 shows a two-dimensional mapping space using two parameters (measurement data 1 and measurement data 2).

Next, with reference to a procedure illustrated in FIG. 4 along with FIGS. 1 to 3, the abnormality-detecting method in this example will be described.

(Step S1)

In the gate-shaped machine tool 10, a workpiece is machined, data (vibration information 41, cutting force information 42, noise information 43, spindle load 44, motor current 45, and electric power 46) is measured at the vibration sensor 21, tool dynamometer 22, noise sensor 23, spindle motor 24, and feed motor 25, and the measured data is acquired by the acquiring unit 40A (acquiring step). At this moment, it is unknown whether the measurement data is normal or abnormal.

(Step S2)

The abnormality diagnosing unit 32 diagnoses, using the one-class SVM method, whether the measurement data measured during machining is normal or abnormal, based on a normal model created by the normal model unit 31 (diagnosing step). In other words, the abnormality diagnosing unit 32 diagnoses whether the measurement data measured during machining belongs to the same class as that of the training data (normal data space). This is not diagnosis using a threshold for each piece of measurement data unlike conventional methods.

(Step S3→S4)

If the measurement data measured during machining belongs to the same class as that of the training data, in other words, if f (x)≥0 in the above formula (3), the measurement data is diagnosed as normal, and the process proceeds to step S5.

(Step S5)

The normal model unit 31 reflects the measurement data diagnosed as normal in the normal model by performing the one-class SVM method using the measurement data and updating the normal model (the first learning step). Addition learning performed during operation as described above (automatic update of the normal model) makes it possible to achieve the optimum diagnosis and also to improve the judgement model (normal model).

(Step S3→S6)

On the other hand, if the measurement data measured during machining does not belong to the same class as that of the training data, in other words, if f (x)<0 in the above formula (3), the measurement data is diagnosed as abnormal, and the process proceeds to step S7.

(Step S7)

When the measurement data is diagnosed as abnormal, the abnormality handling unit 33 stops machining performed with the tool T of the gate-shaped machine tool 10 (handling step). At this time, the abnormality handling unit 33 may, for example, sound or display an alarm. In this case, it is judged that something abnormal has happened to the tool T itself, for example, abnormality such as tool wear, tool snapping, chipping, and breakage has happened, and it is estimated that abnormality also has happened in the state of machining performed with the tool T.

Steps S1 to S7 described above are performed in real time. Measurement data during machining is monitored, and when the measurement data is diagnosed as abnormal, machining is stopped to prevent the deterioration of the precision of the machined workpiece and to reduce damage of the workpiece in real time. In this way, the abnormality detection for the tool T is performed as an in-process processing using machine learning.

(Step S8→S9)

If the abnormality does not require an urgent action, the process does not directly proceed to step S7 but proceed to steps S8 and S9. In this case, the re-diagnosing unit 34 re-diagnoses the measurement data that has diagnosed as abnormal by the abnormality diagnosing unit 32 by a method different from that of the abnormality diagnosing unit 32 (re-diagnosing step). If the measurement data is diagnosed as abnormal again by the re-diagnosing unit 34, the process proceeds to step S7, an abnormality remedy process such as stopping machining is performed. On the other hand, if the measurement data is diagnosed as normal conversely in re-diagnosing by the re-diagnosing unit 34, the process proceeds to step S5, and the normal model is updated by the one-class SVM method using the measurement data at the time.

For the re-diagnosis method, a method different from the one-class SVM method is used. For example, another one-class machine learning, such as system invariant analysis, may be used for the diagnosis. Alternatively, a machining precision measuring instrument of a contact type or a machining precision measuring instrument of a non-contact type, such as a camera or laser, may be used to measure the precision of the machined surface, and the measured values may be used for diagnosis. As a further alternative, a tool shape inspecting device such as a camera may be used to directly diagnose the condition of the tool wear. Further, measurement data may be diagnosed using thresholds, or a skilled operator familiar to the gate-shaped machine tool 10 may diagnose the gate-shaped machine tool 10.

Example 2

Figure 5:
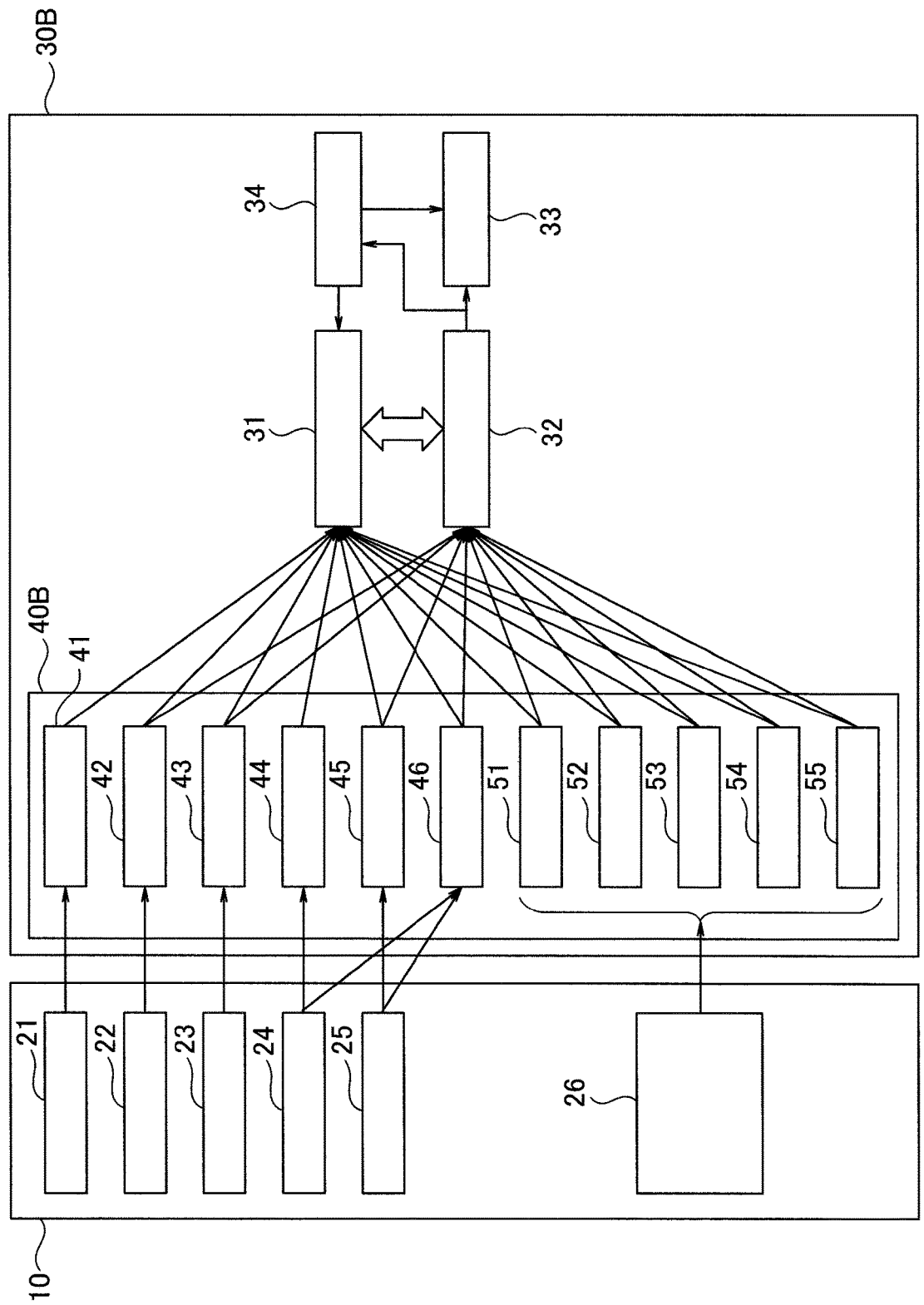
FIG. 5 is a configuration diagram illustrating an example (example 2) of an embodiment of an abnormality-detecting device for tools of machine tools according to the present invention.
Figure 6:
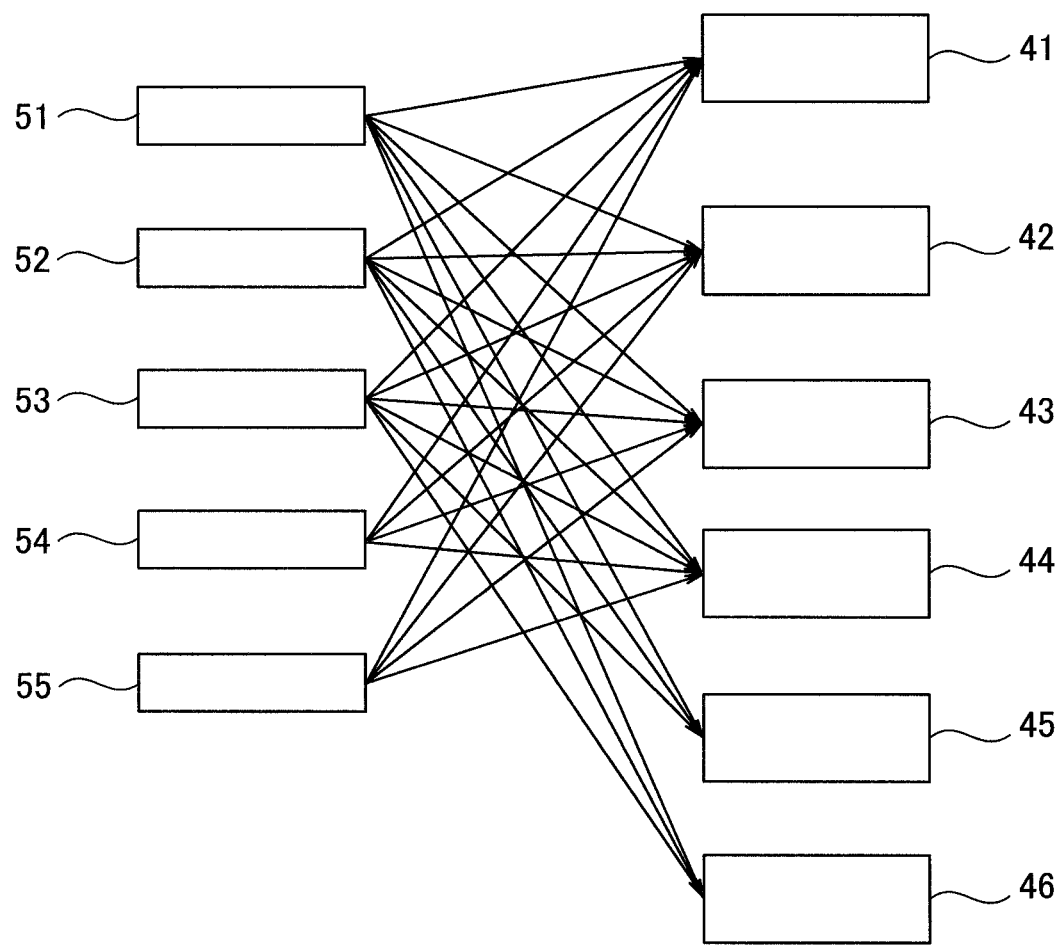
FIG. 6 is a diagram for explaining the correlation between data sets in the abnormality-detecting device for tools of machine tools illustrated in FIG. 5.

FIG. 5 is a configuration diagram illustrating an abnormality-detecting device for tools of machine tools according to this example. FIG. 6 is a diagram for explaining the correlation between data sets in the abnormality-detecting device for tools of machine tools illustrated in FIG. 5.

Also in this example, the gate-shaped machine tool 10 described in example 1 (see FIG. 2 and others) is taken as an example of a machine tool to be diagnosed. An abnormality-detecting device 30B in this example has the same configuration as the abnormality-detecting device 30A described in example 1 (see FIG. 1 and others) except for an acquiring unit 40B illustrated in FIG. 5. Thus, repetitive description is omitted here for the gate-shaped machine tool 10 and the abnormality-detecting device 30B.

The gate-shaped machine tool 10, as described in example 1, includes the vibration sensor 21, tool dynamometer 22, noise sensor 23, spindle motor 24, and feed motor 25, and also in this example, the acquiring unit 40B of the abnormality-detecting device 30B acquires measurement data measured by the sensors and motors (vibration information 41, cutting force information 42, noise information 43, spindle load 44, motor current 45, and electric power 46).

Along with the above measurement data, data related to machining conditions and cutting information is added for machine learning and diagnosis in this example. For example, from machining conditions and cutting information inputted into the gate-shaped machine tool 10 and stored in the memory 26, the spindle rotation speed 51, feed speed 52, removal amount 53, workpiece material 54, and tool type 55 are acquired by the acquiring unit 40B of the abnormality-detecting device 30B and used for machine learning and diagnosis. For the workpiece material 54, for example, the material name and other information are inputted, and for the tool type 55, for example, the material name, coating name, circumferential speed, the number of teeth, and other information are inputted.

Note that in the following, the spindle rotation speed 51, feed speed 52, removal amount 53, workpiece material 54, and tool type 55 are collectively called setting data. In addition, although here, the spindle rotation speed 51, feed speed 52, removal amount 53, workpiece material 54, and tool type 55 are shown as an example of setting data, other setting data for machining conditions and cutting information related to changes in the above measurement data may be added.

Then, in this example, the normal model unit 31 of the abnormality-detecting device 30B uses the above setting data along with the measurement data acquired during normal machining to create a normal model by one-class machine learning and updates the normal model once it is created.

Specifically, also in this example, the normal model unit 31 of the abnormality-detecting device 30B described above performs pre-processing in advance. Machining is performed in advance according to a predetermined machining pattern when the gate-shaped machine tool 10 and the tool T are in their normal states. During machining, data is measured and acquired by the acquiring unit 40B, and along with the acquired measurement data, setting data set as the machining conditions and the cutting information for the machining is used in one-class machine learning to create a normal model. Also here, a machining pattern actually used is preferable for the predetermined machining pattern, and for the one-class machine learning, a one-class SVM method with a kernel method is used.

Figure 7:
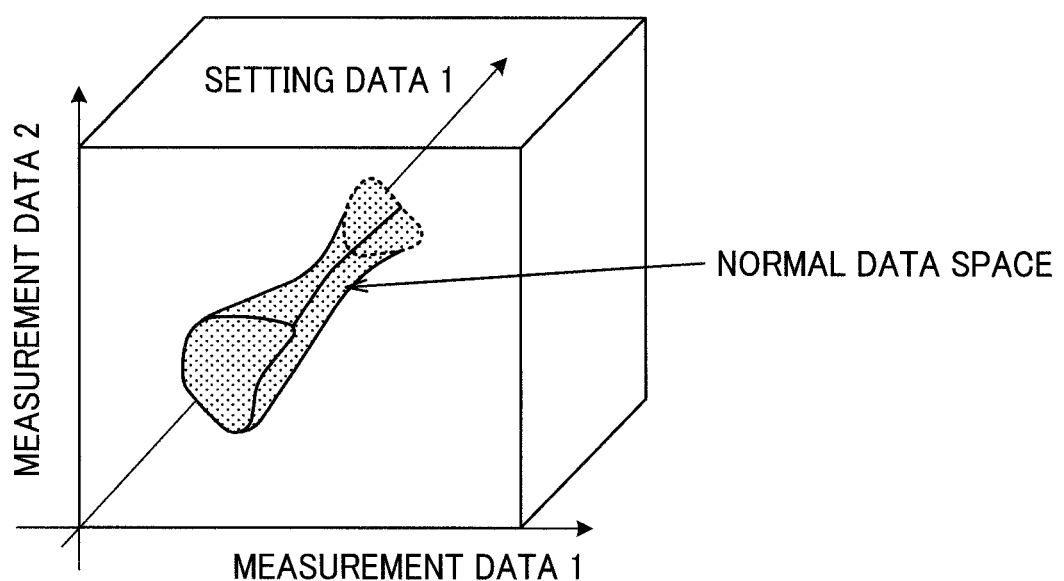
FIG. 7 is a diagram for explaining the change of the normal data space when setting data is added.

The setting data, which is used in addition to the measurement data to perform machine learning as described above in this example, has a correlation as illustrated in FIG. 6 with the measurement data. For example, when the spindle rotation speed 51, feed speed 52, and removal amount 53, which are setting data for machining conditions, change, the vibration information 41, cutting force information 42, noise information 43, spindle load 44, motor current 45, and electric power 46, which are measurement data, also change accordingly. When the workpiece material 54 and the tool type 55, which are setting data for cutting information, change, the vibration information 41, cutting force information 42, noise information 43, and spindle load 44, which are measurement data, also change accordingly.

when machine learning by the one-class SVM method is performed based on these correlations, a normal data space in which normal measurement data and setting data (training data) are mapped in the mapping space (feature space) of the one-class SVM method with an additional dimension of the setting data is generated in this example, for example, as illustrated in FIG. 7. Then, information on the mapping space having the normal data space generated is stored in the storage device as a normal model. Note that to make the diagram simple, FIG. 7 shows a three-dimensional mapping space using three parameters (measurement data 1, measurement data 2, and setting data 1).

Creating a normal model as illustrated in FIG. 7 by machine learning makes it possible to perform diagnosis using the normal model in which the correlations between data sets related to machining are taken into account. In other words, diagnosis is performed with correlations taken into account between the setting data for machining conditions and cutting information and the measurement data during machining.

Conventionally, when setting data for machining conditions and cutting information is changed, new thresholds would have to be set for the items of measurement data that have correlations with the changed setting data. For example, changing the setting for the feed speed 52 changes the spindle load 44 and also changes the vibration information 41 and the like, and thus, new thresholds would have to be set for the spindle load 44, the vibration information 41, and the like. Also increasing the removal amount 53, in other words, the setting for the cutting amount increases the spindle load 44 and also increases the vibration information 41 and the like, and thus, new thresholds would have to be set for the spindle load 44, the vibration information 41, and the like.

On the other hand, since this example is not diagnosis using thresholds for measurement data, unlike the one conventionally performed; even when setting data for machining conditions and cutting information is changed, diagnosis can be performed with the correlation between the setting data and measurement data taken into account as described above. This allows for diagnosis that is appropriate for the change and is also more advanced with high versatility.

Although this example has the above difference from example 1, the same procedure as the one described in example 1 (see FIG. 4) can be applied to the abnormality-detecting method in this example.

Example 3

Figure 8:
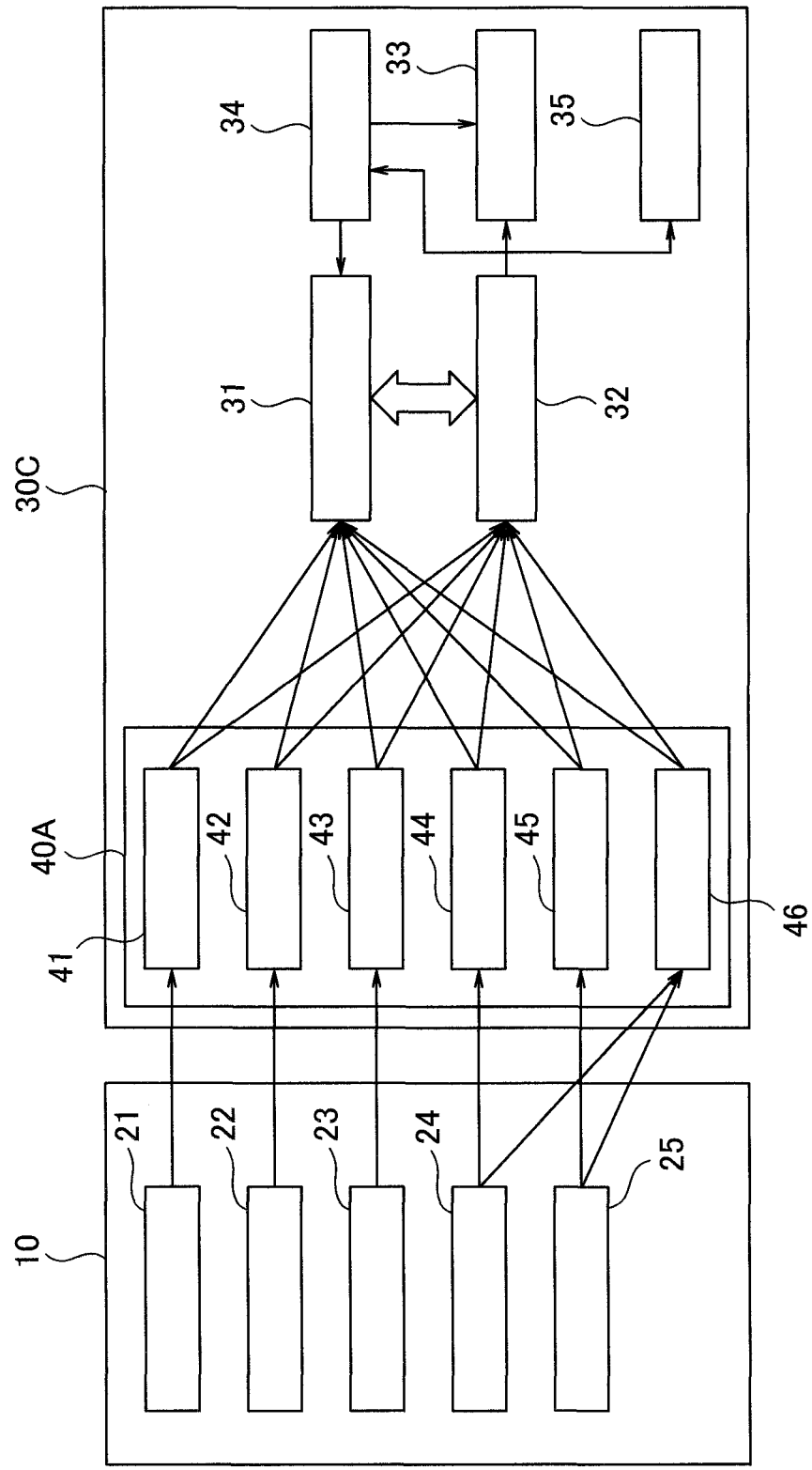
FIG. 8 is a configuration diagram illustrating another example (example 3) of an embodiment of an abnormality-detecting device for tools of machine tools according to the present invention.
Figure 9:
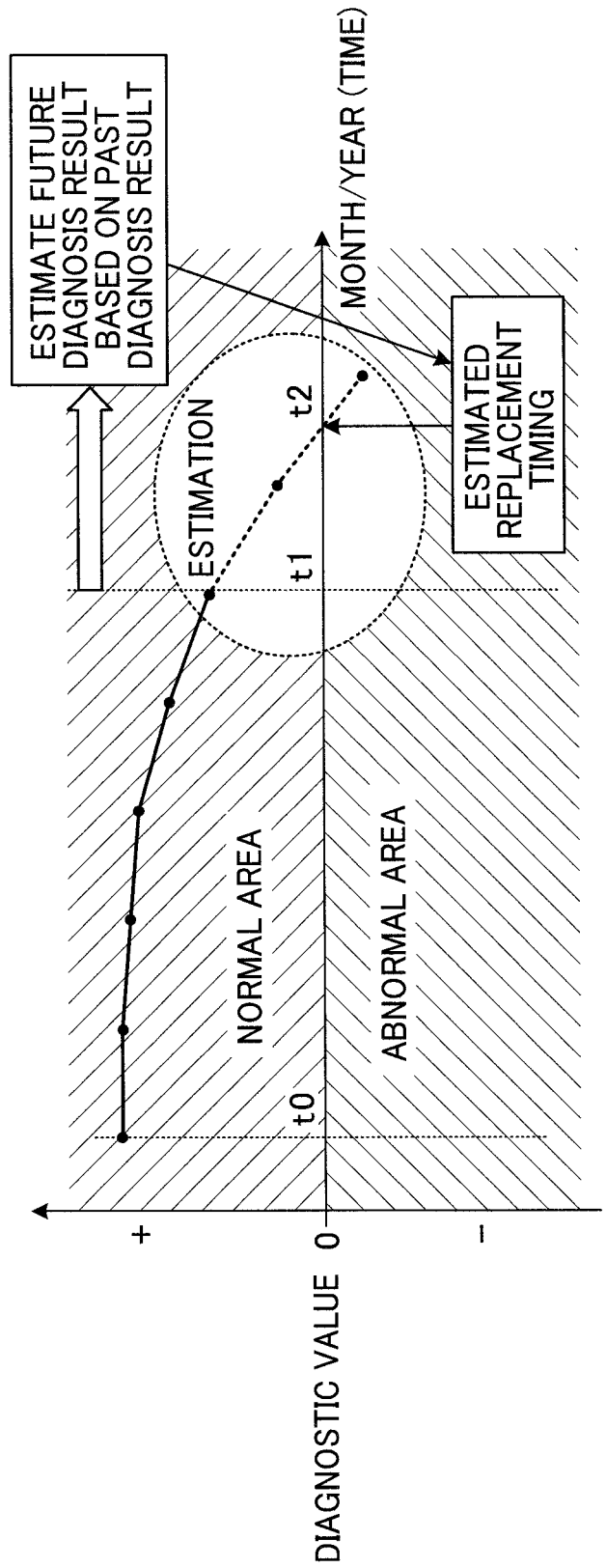
FIG. 9 is a diagram for explaining the estimated replacement timing based on the result of diagnosis by the abnormality-detecting device for tools of machine tools illustrated in FIG. 8.

FIG. 8 is a configuration diagram illustrating an abnormality-detecting device for tools of machine tools according to this example. FIG. 9 is a diagram for explaining the estimated replacement timing based on the result of diagnosis by the abnormality-detecting device for a tool of the machine tool illustrated in FIG. 8.

Also in this example, the gate-shaped machine tool 10 described in example 1 (see FIG. 2 and others) is taken as an example of a machine tool to be diagnosed. An abnormality-detecting device 30C in this example has the same configuration as the abnormality-detecting device 30A described in example 1 (see FIG. 1 and others) except for a replacement-timing estimating unit 35 illustrated in FIG. 8. Thus, repetitive description is omitted here for the gate-shaped machine tool 10 and the abnormality-detecting device 30C.

The abnormality-detecting device 30C, as described in example 1, has the normal model unit 31, abnormality diagnosing unit 32, abnormality handling unit 33, re-diagnosing unit 34, and acquiring unit 40A, and further in this example, has the replacement-timing estimating unit 35 (estimating unit).

The replacement-timing estimating unit 35 estimates the replacement timing of the tool T based on results of the abnormality diagnosing unit 32 diagnosing multiple sets of measurement data. Specifically, the replacement-timing estimating unit 35 estimates the replacement timing based on temporal changes in diagnostic value a obtained by inputting measurement data x into discriminant function g(x) shown in formula (3).

Here, diagnostic value a will be described with reference to FIG. 3 described above. Diagnostic value a corresponds to the position of measurement data x in the mapping space illustrated in FIG. 3. As diagnostic value a becomes closer to 0 from a positive value, the position of measurement data x becomes closer to the boundary of the normal data space from the inner side of the normal data space. When diagnostic value a is equal to 0, measurement data x is positioned on the boundary of the normal data space, and when diagnostic value a is negative, measurement data x is positioned outside the normal data space.

Then, these temporal changes in diagnostic value a are plotted along the time axis to make the graph indicated by the continuous line for multiple diagnostic values a from the previous tool-replacement timing t0 to the present time t1 as illustrated in FIG. 9. In FIG. 9, the multiple diagnostic values a from the previous tool-replacement timing t0 to the present time t1 are larger than 0 and belong to the normal area, but diagnostic value a has a tendency to decrease over time. Extending this tendency by extrapolation makes the graph indicated by the dashed line, from which it can be estimated that diagnostic value a will be 0 at time t2. Note that although here the estimation is performed by extrapolation, other suitable methods may be used for it.

As described above, based on temporal changes in diagnostic value a, the time when diagnostic value a deviates from the normal area, in other words, the time when diagnostic value a becomes 0 from a positive value can be estimated as the replacement timing of the tool T. In this case, time t2 is estimated as an estimated replacement timing for the tool T, and thus the tool T needs to be replaced by time t2. This prevents deterioration in machining accuracy due to delay in tool replacement (deterioration of the tool by wear) before it happens and also prevents tool replacement at a timing earlier than necessary, allowing for the optimum tool management.

This example has a difference described above from example 1, but the same procedure as described in example 1 (see FIG. 4) can be applied to the abnormality-detecting method of this example. The replacement timing estimation by the replacement-timing estimating unit 35 can be performed along with the diagnosis at step S2 described above.

In addition, the replacement-timing estimating unit 35 described in this example may be included in the abnormality-detecting device 30B described in example 2 (see FIG. 5 and others). In that case, the replacement timing of the tool T can be estimated by performing machine learning using the setting data in addition to the measurement data.

Example 4

Figure 10:
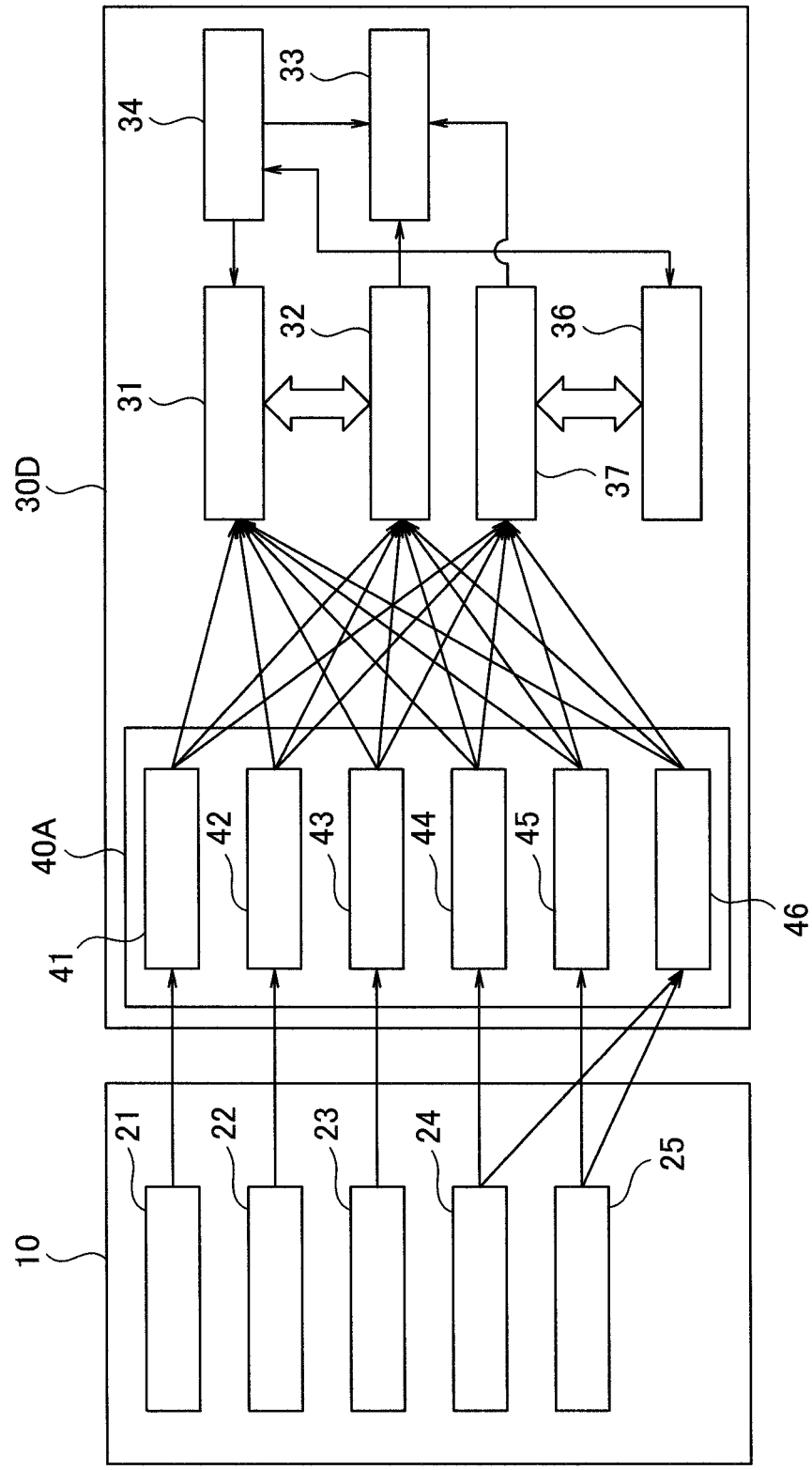
FIG. 10 is a configuration diagram illustrating another example (example 4) of an embodiment an abnormality-detecting device for tools of machine tools according to the present invention.
Figure 11:
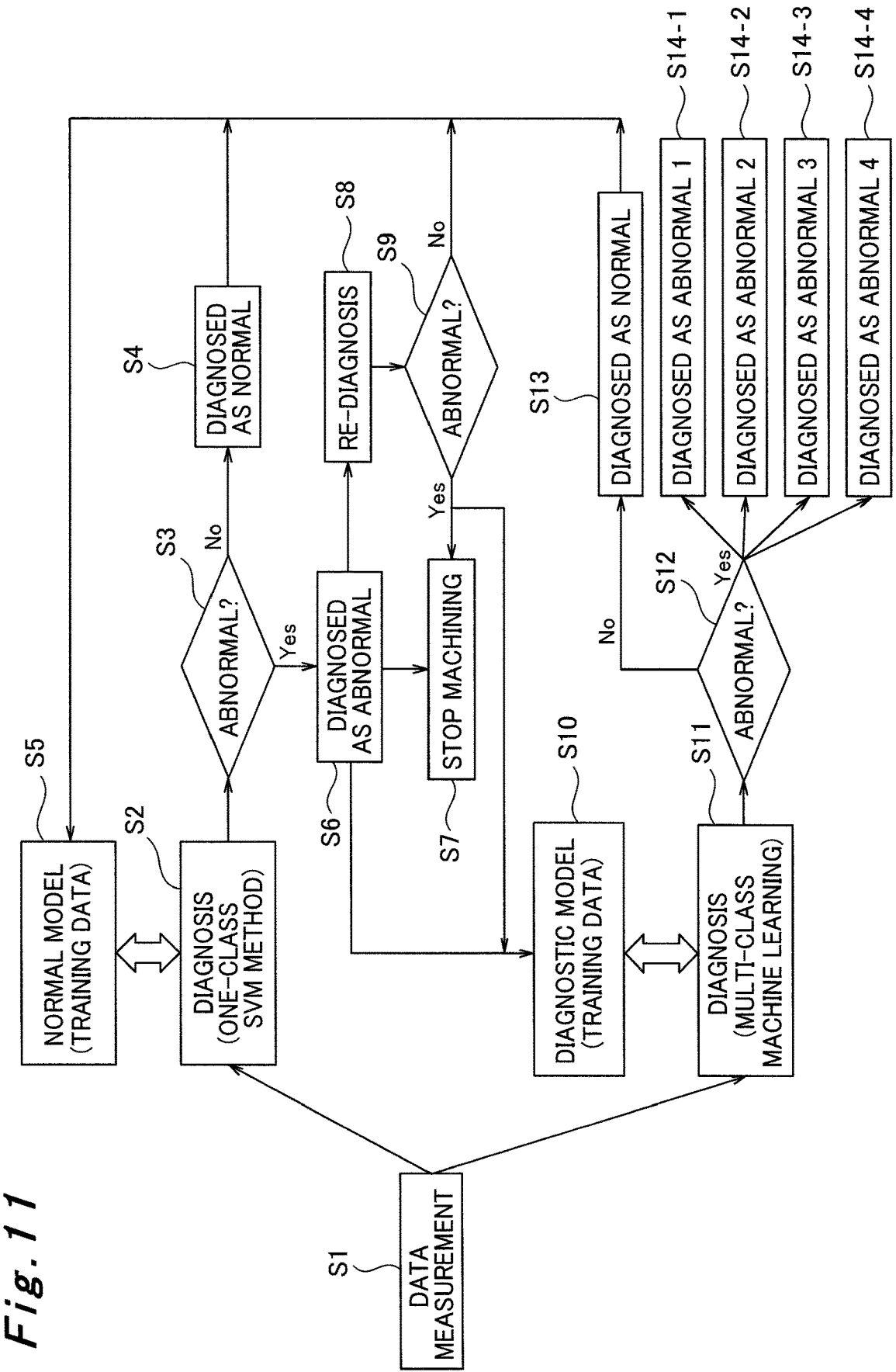
FIG. 11 is a diagram for explaining the procedure of an abnormality-detecting method implemented in the abnormality-detecting device for tools of machine tools illustrated in FIG. 10.
Figure 12:
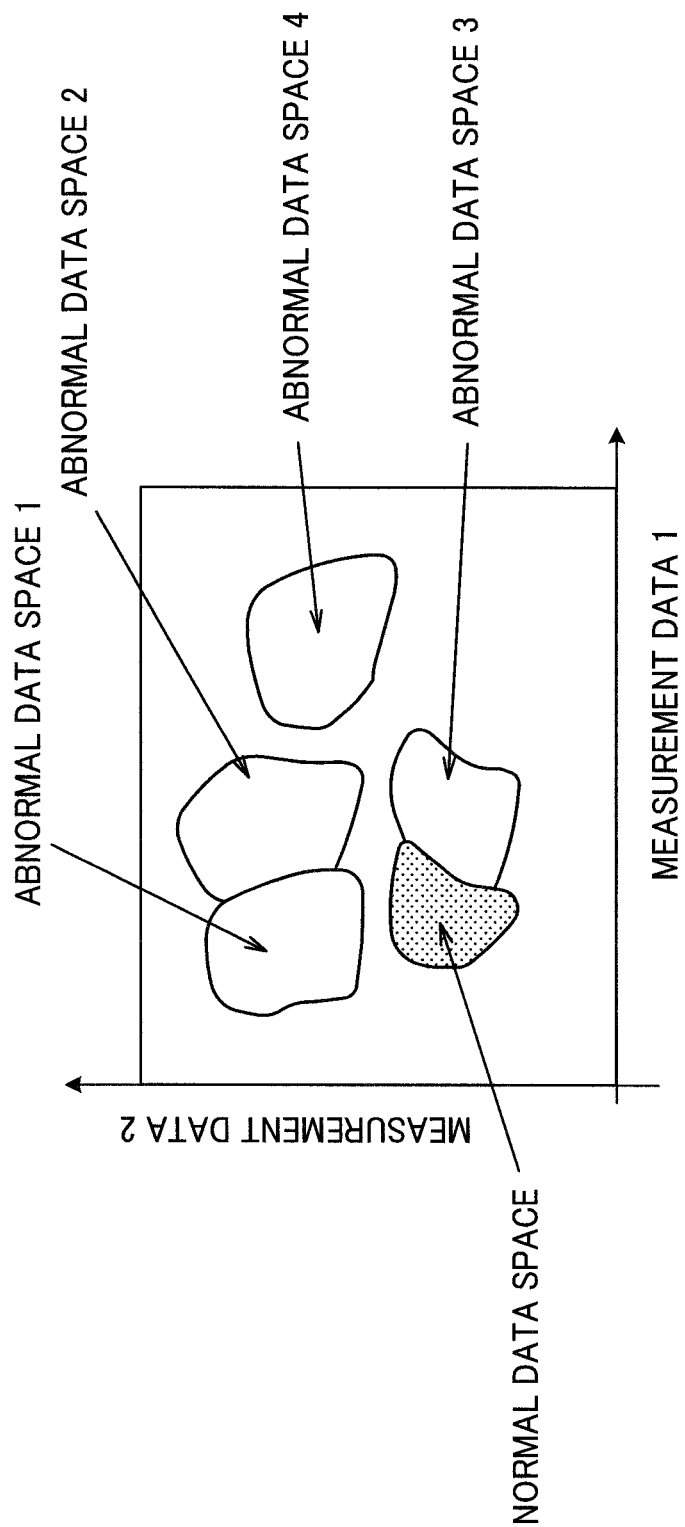
FIG. 12 is a diagram for explaining multiple abnormality data spaces created by multi-class machine learning.
Figure 13:
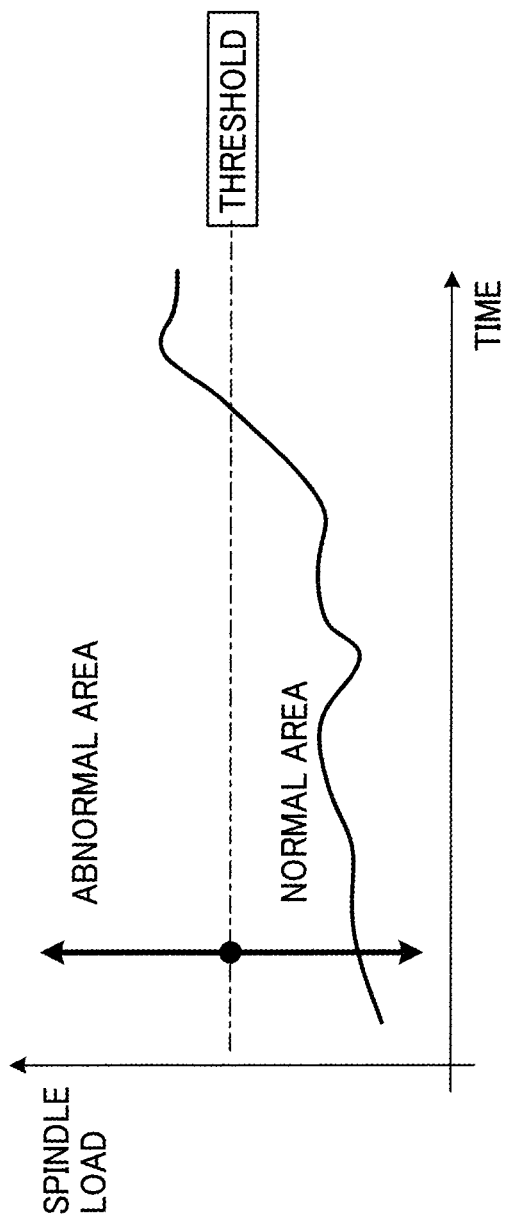
FIG. 13 is a diagram for explaining conventional abnormality diagnosis using thresholds.

FIG. 10 is a configuration diagram illustrating an abnormality-detecting device for tools of machine tools according to this example. FIG. 11 is a diagram for explaining the procedure of an abnormality-detecting method implemented in the abnormality-detecting device for tools of machine tools illustrated in FIG. 10, and FIG. 12 is a diagram for explaining multiple abnormality data spaces created by multi-class machine learning.

Also in this example, the gate-shaped machine tool 10 described in example 1 (see FIG. 2 and others) is taken as an example of a machine tool to be diagnosed. An abnormality-detecting device 30D in this example has the same configuration as the abnormality-detecting device 30A described in example 1 (see FIG. 1 and others) except for a diagnostic model unit 36 and an abnormality classifying unit 37 illustrated in FIG. 10. Thus, repetitive description is omitted here for the gate-shaped machine tool 10 and the abnormality-detecting device 30D.

The abnormality-detecting device 30D, as described in example 1, has the normal model unit 31, abnormality diagnosing unit 32, abnormality handling unit 33, re-diagnosing unit 34, and acquiring unit 40A, and further in this example, has the diagnostic model unit 36 (second learning unit) and the abnormality classifying unit 37 (classifying unit).

The diagnostic model unit 36 uses multiple sets of measurement data that have been diagnosed as abnormal by the abnormality diagnosing unit 32 and stored to create a diagnostic model using multi-class machine learning and updates the diagnostic model once it is created. While acquiring measurement data during machining after the diagnostic model is created, the abnormality classifying unit 37 classifies the state of the measurement data based on the diagnostic model created by the diagnostic model unit 36 to classify the state of abnormality in the tool T.

In this example, multi-class machine learning is used to classify the state of abnormality in the tool T. Here, use of multiple sets of measurement data that have been diagnosed as abnormal by the abnormality diagnosing unit 32 and stored allows for use of multi-class machine learning. For the multi-class machine learning, a multi-class SVM method, decision tree, random forest, neural network, and the like can be used.

When in addition to the one-class SVM method described above, a multi-class machine learning, for example, a multi-class SVM method is used in parallel to perform machine learning; in this example, not only the normal data space can be created in the mapping space (feature space) illustrated in FIG. 3, but also multiple abnormality data spaces 1 to 4 can be created in the other space (abnormality data space), for example, as illustrated in FIG. 12. Abnormality data spaces 1 to 4 illustrated in FIG. 12, which are obtained by mapping measurement data (training data) that have been diagnosed as abnormal, correspond to different abnormality causes, respectively. Then, information on the mapping space including also abnormality data spaces 1 to 4 generated is stored in the storage device as a diagnostic model. Note that to make the diagram simple, FIG. 12 also shows a two-dimensional mapping space using two parameters (measurement data 1 and measurement data 2).

The diagnostic model as illustrated in FIG. 12 is created by machine learning as described above makes it possible to classify the state of measurement data using this diagnostic model to classify the state of abnormality in the tool T.

Next, with reference to a procedure illustrated in FIG. 11, along with FIG. 10, the abnormality-detecting method in this example will be described. Note that steps S1 to S9 are the same as those of the procedure described in example 1 (see FIG. 4), and thus repetitive description will be omitted here.
(Step S10)

When the measurement data measured during machining is diagnosed as abnormal through steps S1 to S6, the measurement data is stored in the storage device, and the diagnostic model unit 36 creates a diagnostic model by multi-class machine learning using the multiple sets of measurement data that have been stored. If there is a diagnostic model already created, the diagnostic model is updated by multi-class machine learning, every time newly measured data is diagnosed as abnormal, using the measurement data (the second learning step).
(Step S11)

If the diagnostic model has already been created by the diagnostic model unit 36, measurement data measured during machining after that is diagnosed also by the abnormality classifying unit 37, and the state of the measurement data is classified by multi-class machine learning based on the diagnostic model created by the diagnostic model unit 36 to classify the state of abnormality in the tool T (classifying step).
(Step S12→S13)

If the measurement data measured during machining belongs to the normal data space, the measurement data is diagnosed as normal, and the process proceeds to step S5 described above.
(Step S12→S14-1 to S14-4)

On the other hand, if the measurement data measured during machining does not belong to the normal data space, the measurement data is diagnosed as abnormal, and further it can be diagnosed whether the measurement data belong to one of abnormality data spaces 1 to 4 or to the other area in the abnormality data space. If the measurement data belongs to one of abnormality data spaces 1 to 4, the measurement data can be classified into one of the abnormalities 1 to 4 according to the abnormality data space that it belongs to.

The abnormality can be classified according to the cause of the abnormality in the tool T. For example, if the measurement data belongs to abnormality data space 1, the abnormality is classified into abnormality 1, which means that the cause is tool wear; if it belongs to abnormality data space 2, the abnormality is classified into abnormality 2, which means that the cause is tool snapping; if it belongs to abnormality data space 3, the abnormality is classified into abnormality 3, which means that the cause is chipping; if it belongs to abnormality data space 4, the abnormality is classified into abnormality 4, which means that the cause is breakage. Note that although in this example, abnormality data spaces 1 to 4 are shown as an example according to abnormalities 1 to 4, the number of the abnormality data spaces is increased or decreased according to the number of classifications.

When measurement data is determined to belong to one of abnormalities 1 to 4 by diagnosis, the abnormality handling unit 33 may stop machining performed with the tool T of the gate-shaped machine tool 10 as well as sound and display an alarm, for example, according to the determined abnormality 1, 2, 3, or 4.

As has been described above, in addition to diagnosis to determine whether the tool T is normal/abnormal, multi-class machine learning is used in parallel in this example to make it possible to estimate the classification of the state of abnormality in the tool T (abnormality cause).

Note that the diagnostic model unit 36 and abnormality classifying unit 37 described in this example may be included in the abnormality-detecting device 30B described in example 2 (see FIG. 5 and others). In that case, the state of abnormality in the tool T can be classified by performing machine learning using the setting data in addition to the measurement data.

The diagnostic model unit 36 and abnormality classifying unit 37 described in this example may also be included in the abnormality-detecting device 30C described in example 3 (see FIG. 8 and others). In that case, the replacement timing of the tool T can be estimated along with the classification of the state of abnormality in the tool T.

Further, in addition to the diagnostic model unit 36 and abnormality classifying unit 37 described in this example, the replacement-timing estimating unit 35 described in example 3 may be included in the abnormality-detecting device 30B described in example 2 (see FIG. 5 and others).

INDUSTRIAL APPLICABILITY

The present invention is suitable for abnormality detection for tools of machine tools, such as machining centers, large machining centers, gear machines, and grinding machines.

REFERENCE SIGNS LIST

10 gate-shaped machine tool
21 vibration sensor
22 tool dynamometer
23 noise sensor
24 spindle motor
25 feed motor
26 memory
30A, 30B, 30c, 30D abnormality-detecting device
31 normal model unit
32 abnormality diagnosing unit
33 abnormality handling unit
34 re-diagnosing unit
35 replacement-timing estimating unit
36 diagnostic model unit
37 abnormality classifying unit
40A, 40B acquiring unit

The invention claimed is:

1. An abnormality-detecting device for a tool of a machine tool that detects abnormality in a tool of a machine tool, comprising:
    an acquiring unit that acquires multiple measured values related to the tool as measurement data;
    a first learning unit that performs one-class machine learning using the measurement data acquired during normal machining to create a normal model;
    a diagnosing unit that, while acquiring the measurement data during machining after the normal model is created, diagnoses based on the normal model whether the measurement data is normal or abnormal; and
    a re-diagnosing unit that re-diagnoses the measurement data that has been diagnosed as abnormal by the diagnosing unit, using an another one-class machine learning different from the one-class machine learning that the diagnosing unit has performed.

2. The abnormality-detecting device for a tool of a machine tool according to claim 1, wherein
    the first learning unit updates the normal model by performing the one-class machine learning using the measurement data that has been diagnosed as not abnormal by the diagnosing unit and the measurement data that has been diagnosed as not abnormal by the re-diagnosing unit.

3. The abnormality-detecting device for a tool of a machine tool according to claim 1, further comprising
    a remedying unit that stops machining performed with the tool when the measurement data is diagnosed as abnormal by the diagnosing unit or the re-diagnosing unit.

4. The abnormality-detecting device for a tool of a machine tool according to claim 1, wherein
    the first learning unit creates or updates the normal model by performing the one-class machine learning, adding setting data related to a machining condition and cutting information for machining.

5. The abnormality-detecting device for a tool of a machine tool according to claim 1, further comprising
    an estimating unit that, in the case where the one-class machine learning is a one-class support vector machine using a kernel method, performs the machine learning to make a discriminant function that diagnoses whether the measurement data is normal or abnormal by a sign of the discriminant function, positive or negative, and based on a temporal change in a value of the discriminant function with the measurement data inputted, estimates time when the value changes from a positive value to 0 as a replacement timing for the tool.

6. The abnormality-detecting device for a tool of a machine tool according to claim 1, further comprising:
    a second learning unit that performs multi-class machine learning using multiple sets of the measurement data that have been diagnosed as abnormal by the diagnosing unit and stored, to create a diagnostic model; and
    a classifying unit that, while acquiring the measurement data during machining after the diagnostic model is created, classifies a state of the measurement data based on the diagnostic model to classify a state of abnormality in the tool.

7. The abnormality-detecting device for a tool of a machine tool according to claim 6, wherein
    the second learning unit updates the diagnostic model after the diagnostic model is created by performing the multi-class machine learning using the measurement data that has been diagnosed as abnormal by the diagnosing unit.

8. An abnormality-detecting method for a tool of a machine tool, used for detecting abnormality in a tool of a machine tool, comprising:
    an acquiring step of acquiring multiple measured values related to the tool as measurement data;
    a first learning step of performing one-class machine learning using the measurement data acquired during normal machining to create a normal model;
    a diagnosing step of, while acquiring the measurement data during machining after the normal model is created, diagnosing based on the normal model whether the measurement data is normal or abnormal; and
    a re-diagnosing step of re-diagnosing the measurement data that has been diagnosed as abnormal in the diagnosing step, using an another one-class machine learning different from the one-class machine learning that has been performed in the diagnosing step.

9. The abnormality-detecting method for a tool of a machine tool according to claim 8, wherein in the first learning step, the normal model is updated by performing the one-class machine learning using the measurement data that has been diagnosed as not abnormal in the diagnosing step and the measurement data that has been diagnosed as not abnormal in the re-diagnosing step.

10. The abnormality-detecting method for a tool of a machine tool according to claim 8, further comprising a remedying step of stopping machining performed with the tool when the measurement data is diagnosed as abnormal in the diagnosing step or the re-diagnosing step.

11. The abnormality-detecting method for a tool of a machine tool according to claim 8, wherein in the first learning step, the normal model is created or updated by performing the one-class machine learning, adding setting data related to a machining condition and cutting information for machining.

12. The abnormality-detecting method for a tool of a machine tool according to claim 8, further comprising an estimating step of, in the case where the one-class machine learning is a one-class support vector machine using a kernel method, performing the machine learning to make a discriminant function that diagnoses whether the measurement data is normal or abnormal by a sign of the discriminant function, positive or negative, and based on a temporal change in a value of the discriminant function with the measurement data inputted, estimating time when the value changes from a positive value to 0 as a replacement timing for the tool.

13. The abnormality-detecting method for a tool of a machine tool according to claim 8, further comprising:

a second learning step of performing multi-class machine learning, using multiple sets of the measurement data that have been diagnosed as abnormal in the diagnosing step and stored, to create a diagnostic model; and a classifying step of, while acquiring the measurement data during machining after the diagnostic model is created, classifying a state of the measurement data based on the diagnostic model to classify a state of abnormality in the tool.

14. The abnormality-detecting method for a tool of a machine tool according to claim 13, wherein in the second learning step, the diagnostic model is updated after the diagnostic model is created by performing the multi-class machine learning using the measurement data that has been diagnosed as abnormal in the diagnosing step.

* * * * *